(12) United States Patent
Shekhar et al.

(10) Patent No.: US 9,805,269 B2
(45) Date of Patent: Oct. 31, 2017

(54) TECHNIQUES FOR ENHANCING CONTENT MEMORABILITY OF USER GENERATED VIDEO CONTENT

(71) Applicant: Adobe Systems Incorporated, San Jose, CA (US)

(72) Inventors: Sumit Shekhar, Bangalore (IN); Srinivasa Madhava Phaneendra Angara, Noida (IN); Manav Kedia, Kolkata (IN); Dhruv Singal, New Delhi (IN); Akhil Sathyaprakash Shetty, Mumbai (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 119 days.

(21) Appl. No.: 14/946,952

(22) Filed: Nov. 20, 2015

(65) Prior Publication Data

US 2017/0147906 A1  May 25, 2017

(51) Int. Cl.
| | | |
|---|---|---|
| *G06K 9/68* | (2006.01) | |
| *H04N 9/80* | (2006.01) | |
| *G06F 17/30* | (2006.01) | |
| *G06K 9/00* | (2006.01) | |
| *G06K 9/32* | (2006.01) | |
| *G11B 27/28* | (2006.01) | |

(52) U.S. Cl.
CPC ......... *G06K 9/00751* (2013.01); *G06K 9/325* (2013.01); *G11B 27/28* (2013.01)

(58) Field of Classification Search
USPC ............................ 382/218; 386/241; 707/748
See application file for complete search history.

(56) References Cited

U.S. PATENT DOCUMENTS

| 9,129,008 B1 * | 9/2015 | Kuznetsov | G06F 17/30038 |
| 9,336,268 B1 * | 5/2016 | Moudy | G06F 17/30412 |
| 2008/0115089 A1 * | 5/2008 | Lee | G09G 5/393 715/838 |
| 2014/0003716 A1 * | 1/2014 | Fedorovskaya | G06K 9/00677 382/170 |
| 2014/0003737 A1 * | 1/2014 | Fedorovskaya | G06Q 50/01 382/276 |

(Continued)

OTHER PUBLICATIONS

P. Isola et al., "What makes an image memorable?", IEEE Conference on Computer Vision and Pattern Recognition (CVPR), 2011. pp. 145-152.

(Continued)

*Primary Examiner* — Kathleen Y Dulaney
(74) *Attorney, Agent, or Firm* — Finch & Maloney PLLC

(57) ABSTRACT

Techniques are described for analyzing a video for memorability, identifying content features of the video that are likely to be memorable, and scoring specific content features within the video for memorability. The techniques can be optionally applied to selected features in the video, thus improving the memorability of the selected features. The features may be organic features of the originally captured video or add-in features provided using an editing tool. The memorability of video features, text features, or both can be improved by analyzing the effects of applying different styles or edits (e.g., sepia tone, image sharpen, image blur, annotation, addition of object) to the content features or to the video in general. Recommendations can then be provided regarding memorability score caused by application of the image styles to the video features.

17 Claims, 6 Drawing Sheets

(56) References Cited

U.S. PATENT DOCUMENTS

| | | | | |
|---|---|---|---|---|
| 2014/0351264 A1* | 11/2014 | Murray | ............ | G06F 17/30247 707/748 |
| 2015/0036947 A1* | 2/2015 | Datar | ................... | G06T 3/0012 382/298 |
| 2015/0055854 A1* | 2/2015 | Marchesotti | ........... | G06K 9/627 382/159 |
| 2015/0294191 A1* | 10/2015 | Zhang | ................. | G06N 99/005 382/160 |
| 2015/0363688 A1* | 12/2015 | Gao | ........................ | G06N 3/04 706/27 |
| 2016/0071549 A1* | 3/2016 | von Sneidern | ...... | G11B 27/031 386/241 |

OTHER PUBLICATIONS

P. Isola et al., "Understanding the intrinsic memorability of images", Advances in Neural Information Processing Systems (NIPS), 2011, 9 pages.

Jun Auza, "5 Android Apps That Can Help You Shoot Videos Like a Pro", [retrieved online] [retrieved on Nov. 20, 2015] <URL: http://www.junauza.com/2013/08/android-apps-that-can-help-you-shoot-videos-like-pro.html>; 4 pages.

T. Judd et al. "Learning to predict where humans look", International Conference on Computer Vision (ICCV), 2009, 8 pages.

P. Dollar et al.; "Behavior recognition via sparse spatio-temporal features", Visual Surveillance and Performance Evaluation of Tracking and Surveillance, 2005, 8 pgs.

A. Karpathy et al.; "Deep Visual-Semantic Alignments for Generating Image Descriptions", IEEE Computer Vision and Pattern Recognition, 2015, 17 pages.

R. Socher et al., "Semi-Supervised Recursive Autoencoders for Predicting Sentiment Distribution", Conference on Empirical Methods on Natural Language Processing, 2015, 11 pages.

Wikipedia, "Gradient Boosting Regression" [retrieved online] [ retrieved on Nov. 20, 2015] <URL:https://en.wikipedia.org/wiki/Gradient_boosting>, 5 pages.

Junwei Han et al., "Learning Computational Models of Video Memorability from fMRI Brain Imaging", IEEE Journal of Cybernetics, 2014, pp. 1692-1703.

* cited by examiner

100

TECHNIQUES FOR ENHANCING CONTENT MEMORABILITY OF USER GENERATED VIDEO CONTENT

FIELD OF THE DISCLOSURE

The present disclosure relates generally to video production and editing technology. Specifically, the present disclosure is directed to the adaptation of content in user generated videos to improve the memorability of the content.

BACKGROUND

Video content is widely available and frequently viewed on mobile devices, such as tablets, smart phones, and other mobile computing devices. One factor facilitating the increased accessibility of video content is the convenience and relative low cost of video recording equipment. In some cases, this video recording equipment is a mobile computing device that is the same type of device used to view video content (e.g., a tablet, smartphone, or other mobile computing device). Applications for recording, sharing, and editing of videos are also very common and have proliferated as the quantity of sharable video content has grown. Video editing and video sharing applications provide a variety of tools for video creators and editors. These tools include the ability of an editor to select and remove scenes or frames of the video, add text or annotations to the video, and apply image styles (e.g., sepia tone) to the video. In some cases, the editor uses these tools to improve the technical quality of the video. However, despite the convenience and accessibility of video editing software, the ability of video content creators to reach viewers is a non-trivial task. For instance, because of the large and ever increasing body of video content, it is difficult for a video editor or creator to produce a video that stands out from other videos competing for the attention of viewers. Existing video editing and sharing tools, however, do not address this challenge.

Figure 1:
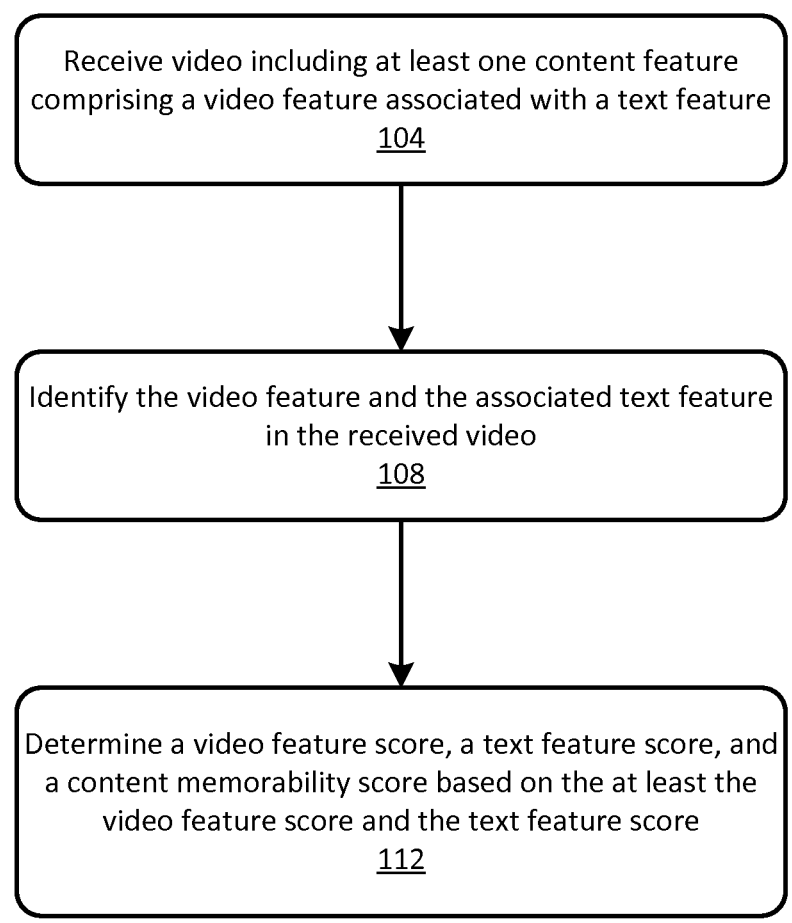
FIG. 1 is a high level flow diagram illustrating a method for analyzing a video to determine a feature score corresponding to an identified content feature of a video, in accordance with an embodiment of the present disclosure.

The figures depict various embodiments of the present disclosure for purposes of illustration only. Numerous variations, configurations, and other embodiments will be apparent from the following detailed discussion.

DETAILED DESCRIPTION

As previously noted, with the vast, and ever-increasing, amount of video content available through applications and websites, it is increasingly difficult for editors and creators to produce a video that stands out or is otherwise memorable to viewers. For example, when browsing through video content, a viewer may exhaust his or her attention span before finding a video of interest, which makes remembering the content of a video of interest more challenging for the viewer. While some available video editing tools apply image styles to a video to improve the technical quality of the video, these tools do not apply the image styles in a way that improves the "memorability" of a video (i.e., the likelihood or probability that a video will be memorable to a viewer). Nor is there any guide for a prospective video publisher to use to determine or otherwise predict the memorability of video content.

Thus, and in accordance with an embodiment of the present disclosure, a system is provided that is configured to enable a video creator or editor to analyze a video for memorability, identify features of video content (alternatively referred to as a "video") likely to be memorable by a viewer, and predict memorability of specific features within a video. With such predictions in hand, the user can then edit or produce a video that exploits or otherwise uses the more memorable portions of the video. In a similar fashion, the user can edit out or otherwise exclude video content that is less memorable. Thus, the resulting overall video can be produced to be relatively dense with memorable content, rather than have the same memorable content lost in a sea of less memorable content. To this end, the system can be used to improve the memorability of video. In some embodiments, memorability of video features, text features, or both can be improved, for example, by analyzing the effects of applying different image styles (e.g., sepia tone, image sharpen, image blur) to the features. In a similar fashion, text, annotations, and graphics can be added to the video, and then evaluated for effect on memorability of the video. Recommendations can then be provided to the video creator, with respect to which image styles, annotations, graphics, or other such edits that will yield the best memorability score or, alternatively, yield a memorability score over a certain threshold. In some such cases, the recommendations may describe the effects on memorability of the corresponding video. These effects can be indicated, for example, by a content memorability score or a change in content memorability score compared to a score of the video without implementation of the recommendation (e.g., "this particular edit changes the memorability score of the video from a 5 to an 8 on a scale of 1 to 10, while this particular edit changes the memorability score of the video from a 5 to a 4 on a scale of 1 to 10."). In some cases, note that a combination of edits may improve the memorability score, while the individual edits on their own may not. Thus, the user may have a better sense of what edits and combinations of edits are likely to improve the memorability of the video.

The phrase "content features" as used herein includes video features and text features within a video. Examples of video features include, but are not limited to, an entire video, scenes (i.e., segments of adjacent video frames), individual video frames, an image within a frame, an object within a frame, and a portion of an image within a frame. A given video feature may be organic to the original video captured by an imaging device, or an add-in that was edited into the video using an editing tool. Examples of text features include, but are not limited to, text accompanying a video or video feature, such as captions, titles, subtitles, comments, labels corresponding to frames and images, names, and other text annotations of a video. A given text feature may be organic to the original video captured by an imaging device, or an add-in that was edited into the video using an editing tool.

One benefit of the techniques provided herein, according to some embodiments, includes providing video creators and editors an analytical tool that indicates the likelihood or probability that a video will be memorable to a viewer. Another benefit of the techniques provided herein, according to some embodiments, includes identifying and analyzing one or more content features in a video, and determining corresponding memorability scores for each of the identified and analyzed content features. Again, note that such features may be organic features of the originally captured video or add-in features. This helps editors and creators understand how to improve memorability of a video, particularly with respect to video scenes, frames, or images originally intended by the editor or creator to be memorable to viewers. Another benefit of the techniques provided herein, according to some embodiments, is the improvement in accurately determining memorability by comparing the semantic meaning of a video feature to the semantic meaning of an accompanying text feature. In more detail, videos in which there is a high similarity between the semantic meanings of a video feature and the accompanying text are identified as having a higher memorability score, in some embodiments. Another benefit of the techniques provided herein, according to some embodiments, includes providing to video creators and editors recommendations for applying image styles (e.g., sharpen, blur, smooth, sepia tint, vintage tint) that, when selectively applied to content features, will improve memorability. Similar recommendations can be provided with respect to added features, such as text, graphics, and other additions.

Memorability Score

FIG. 1 presents a flow diagram of a method 100 for producing a memorability score of a least one of a video, a video feature within the video, a text feature within the video, and combinations thereof, in an embodiment. As will be appreciated in light of this disclosure, the one or more features being scored may be organic features of the originally captured video or add-in features or a combination of such features. The method 100 begins by receiving 104 video content that includes at least one content feature. In this embodiment, the at least one content feature includes at least one video feature and at least one associated text feature. Text features may annotate the video as a whole and/or be associated with one or more video features within the video. Once received, the at least one content feature (i.e., the video feature and the associated text feature) is identified 108. A video feature score and a text feature score are determined for the corresponding identified video feature and text feature, for each of the at least one content features analyzed. As will be described below in more detail, the analysis of video features and text features are distinct from one another, according to some example embodiments. The products of these distinct analyses are combined to produce a content memorability score that in some cases applies to a specific content feature and in other cases applies to a video as a whole.

Figure 2:
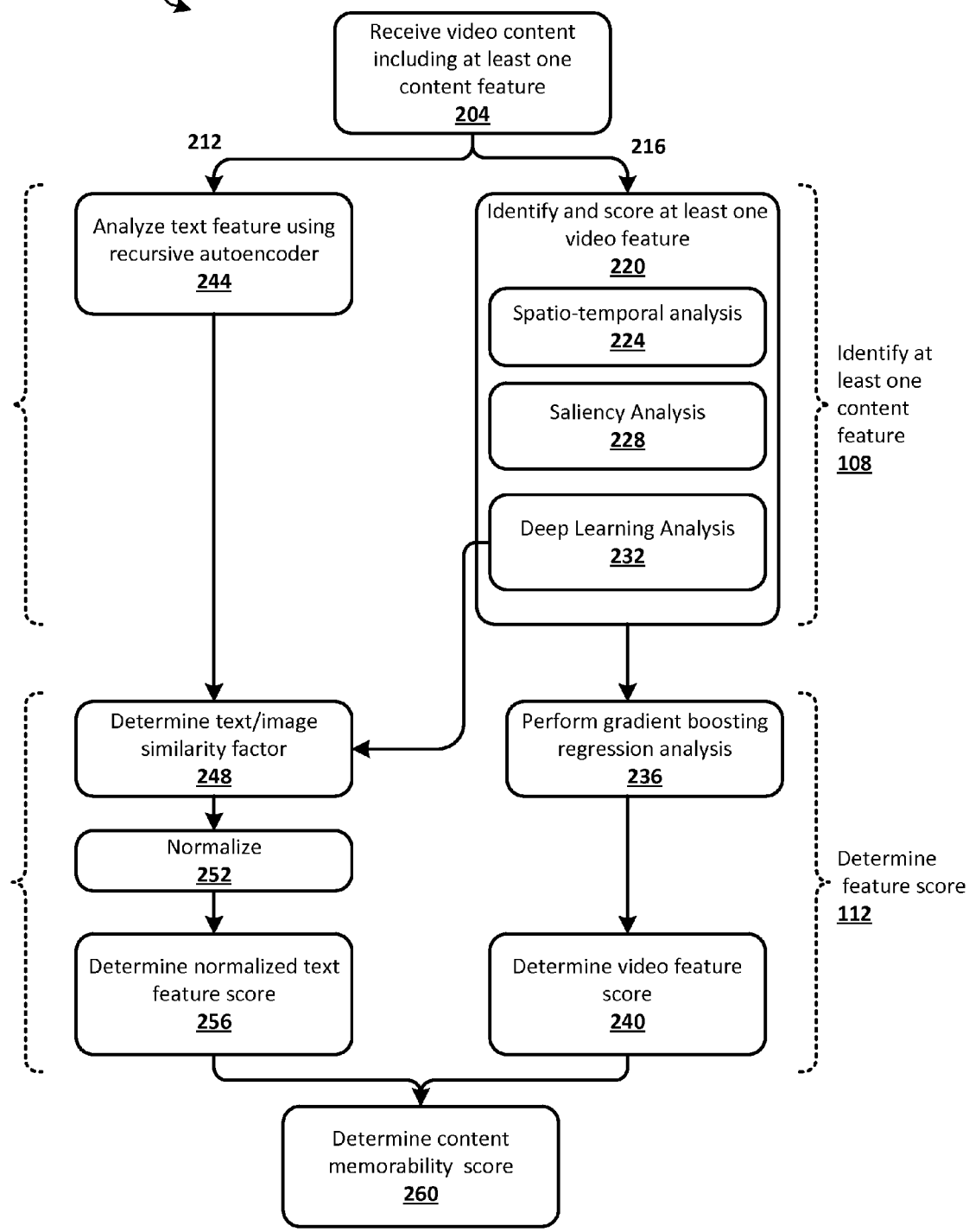
FIG. 2 is a detailed flow diagram illustrating a method for producing a content memorability score, in accordance with an embodiment of the present disclosure.

As presented above, some embodiments of the present disclosure provide a memorability score that indicates memorability of at least one content feature of a video. FIG. 2 illustrates a method 200 for analyzing a video to produce a content memorability score for at least one of a content feature and a video as a whole. The method 200 illustrated by FIG. 2 begins with receiving 204 a video. For illustration, the received video in this example will be assumed to include two different elements: a video and associated text annotating the video. The text annotation may be organic to the originally captured video or added in after the video was captured by operation of a video editing tool.

As schematically shown in method 200, the video and the text are analyzed in separate operations 216 and 212, respectively. The video in this example is analyzed to identify at least one video feature in the video and score 220 the identified feature using three separate algorithms: a spatio-temporal algorithm 224, an image saliency algorithm 228, and a deep neural network learning algorithm 232.

A spatio-temporal analysis 224 of the video identifies video features in which there is relative movement between images within the video. This analysis provides a corresponding contribution to the memorability score that is proportional to the speed of movement and/or the proportion of a field of view of the video content that is moving. These moving (or dynamic) video features are more likely to be memorable to a viewer than static images. In some embodiments, the spatio-temporal analysis 224 is accomplished by setting a spatio-temporal frame of reference using the video itself and then identifying video features moving relative to the frame of reference. For example, a series images in a video of a vehicle traversing an entire width of a field of view in the video over a unit of time is labeled as faster spatio-temporal movement than a series of images of snow traversing only a portion of the field of view in the video over the same unit of time. Using this frame of reference also removes spatio-temporal artifacts, such a camera shake, that appear to cause movement in the video but affect the entire image uniformly. Because viewers are more likely to remember faster movement than slower movement, faster spatio-temporal movement provides a larger contribution to a content feature memorability score than slower spatio-temporal movement. Similarly, viewers are more likely to remember images or scenes in which more of the field of view is moving. The spatio-temporal analysis 224 produces a spatio-temporal score that is used, in part, to determine a video feature score 240, as described below in more detail.

The salience analysis 228 analyzes video to identify, independent of any temporal factors, specific objects and images prominently displayed within the video that are more likely to be memorable to a viewer. Once analyzed, a corresponding contribution to the video feature score 240 is determined. Those objects and images identified as likely to be memorable provide a higher contribution to the memorability score than those objects and images identified as less likely to be memorable. According to some embodiments, algorithms used for the salience analysis 228 include functions that evaluate color and shape of an object or image. For example, brightly colored objects, or objects of a color that contrasts with a surrounding background color are generally identified as more salient than those colors that are dull or that do not contrast with their surroundings. Salience functions are also optionally determined, in part, by a portion of a display area occupied by an image and/or a position within the screen that an image occupies. For example, a video with a scene of distant people occupying a small percentage of a display would be less memorable than a scene with people placed in the middle of the display field occupying 20-50% of available display area.

Upon identification of salient video features of the video using the saliency analysis 228, the saliency analysis produces a salience score that is another component of the video feature score 240, as described below in more detail.

Unlike other video sharing and video editing applications, some embodiments of the present disclosure apply a deep neural network learning algorithm 232 as an alternative or third element for identifying content features as likely to be memorable to viewers and for determining a corresponding contribution to the video feature score 240. The deep neural network learning algorithm 232 is trained. Training can be performed by using a training vehicle, such as an entire video, frames in a video, and/or images extracted from a video and providing corresponding semantic descriptions. Using the information gathered from this training, the deep neural network learning algorithm 232 analyzes the video, identifies video features and associates a semantic description with each of the recognized video features. Upon training, the deep neural network learning algorithm 232 is applied to the video to associate a semantic description with each video feature and image recognizable to the deep neural network learning algorithm 232. The semantic descriptions of the video features produced by the deep neural network learning algorithm 232 are then used to produce a deep neural network learning score, which is used in part, to determine the video feature score 240, as described below in more detail. These semantic descriptions are also used as a component of text feature analysis, as described below in more detail.

Each of the contributions from the spatio-temporal analysis 224, salience analysis 228, and deep neural network learning analysis 232 may be optionally weighted by a multiplier. The multiplier is used to change the relative weight of the contributions from each of the three analyses.

Each of the three scores are further processed by regressor 236 (such as a gradient boosting regressor, a random forest regressor, or logistic regressor) to produce the video feature score 240. Regression functions other than a gradient boosting regressor may also be applied to the video feature score 240 contributions from the spatio-temporal analysis 224, salience analysis 228, and deep neural network learning analysis 232.

The process for determining 212 a normalized text feature score 256 begins with the extraction of at least one text feature from the text of the video. To extract the at least one text feature, the text is analyzed 244 using a recursive autoencoder. The recursive autoencoder 244 analyzes the text of text features to extract a semantic meaning from the text features via a fixed-dimension vector. One example of a semantic autoencoder used to extract semantic meaning from text is a semi-supervised recursive autoencoder. Other autoencoders may also be used to analyze text, identify text features and extract a semantic meaning from the identified text features.

Once the recursive autoencoder has analyzed 244 the text and extracted a semantic vector from a text feature, and once the deep neural network learning analysis 232 has identified semantic descriptions of objects in a video feature, these two semantic meaning are compared to determine text/image meaning similarity 248. This step is helpful in determining whether a particular video or video feature will be memorable because video images that are accompanied by descriptive text are generally more memorable that video images alone or video images accompanied by text that is not descriptive. The similarity of the semantic meanings of the video feature compared to that of the text is assigned a value based on the degree of similarity and then normalized 252 using a sigmoid function into a normalized text feature score having a value between 0 and 1. The video feature score 240 is then multiplied by the normalized text feature score 256 to determine 260 a content memorability score.

Video Memorability Analysis and Improvement

As mentioned above, one benefit of the method 200 is that the analysis provides video editors and creators with information regarding the memorable content features of a video. Even if the video being analyzed is not the work of the video editor or creator performing the method 200, the method 200 provides information that is helpful for understanding the content features that make a video memorable. As is described below in more detail, some embodiments of the present disclosure not only identify which content features of a video are more likely to be memorable, but also provide recommendations regarding the application of image styles to improve memorability of a video.

Figure 3:
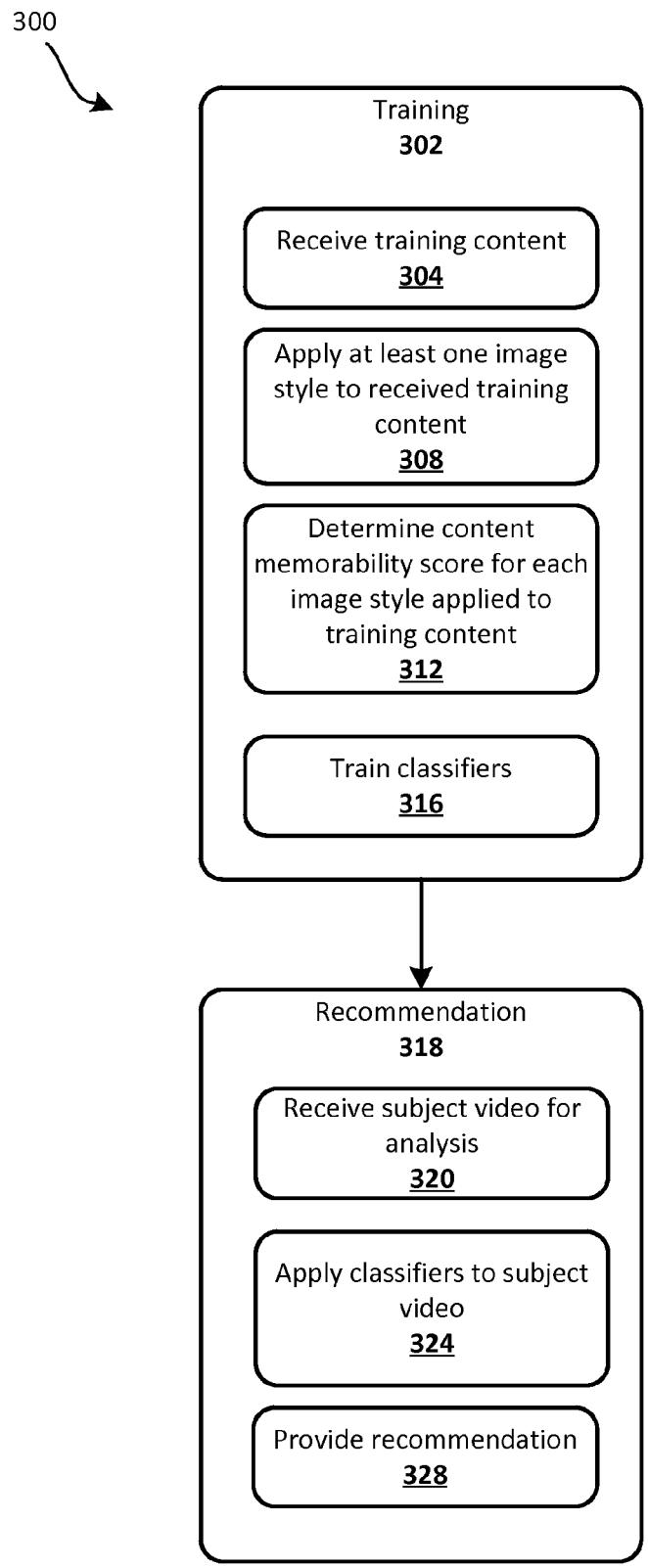
FIG. 3 is a flow diagram for creating a tool for providing recommendations to improve memorability a video and a content feature in the video, in accordance with an embodiment of the present disclosure.

FIG. 3 illustrates a method 300 for creating a tool for providing recommendations to improve memorability of a video, at least one content feature within a video, and combinations thereof. The method 300 is illustrated as having two meta-steps: a training phase 302 and a recommendation phase 318. The training phase 302 receives training content 304, such as training videos and training content features, that are used to generate reference data regarding the effect of image styles on memorability. The received training content (e.g., a video) then has at least one image style applied 308 to it. In some embodiments, all image styles available are applied individually and in all of the various combinations so that a complete understanding of the effect of image styles (and any combinations thereof) on content feature memorability is developed. For each image style, and each combination of image styles, a content memorability score is determined according to methods 100 and 200 described above. The content memorability score is determined 312 for an entire video in some embodiments or individual content features in other embodiments. Classifiers for each image style are then trained 316 using the memorability scores previously determined. The classifiers improve computational efficiency when determining a recommendation for improving memorability of a video provided by a user.

Having completed training meta-step 302, the training is applied to help editors and video creators improve the memorability of video in recommendation meta-step 318. A subject video is received 320 for analysis. The classifiers trained in meta-step 302 are then applied 324 to the received subject video. Using the trained classifiers, the memorability of the subject video is analyzed for each image style available. Based on a ranked list of the memorability scores predicted by the classifiers for each of the image styles and each of the content features analyzed, a recommendation is provided 328.

Example User Interface

Figure 4:
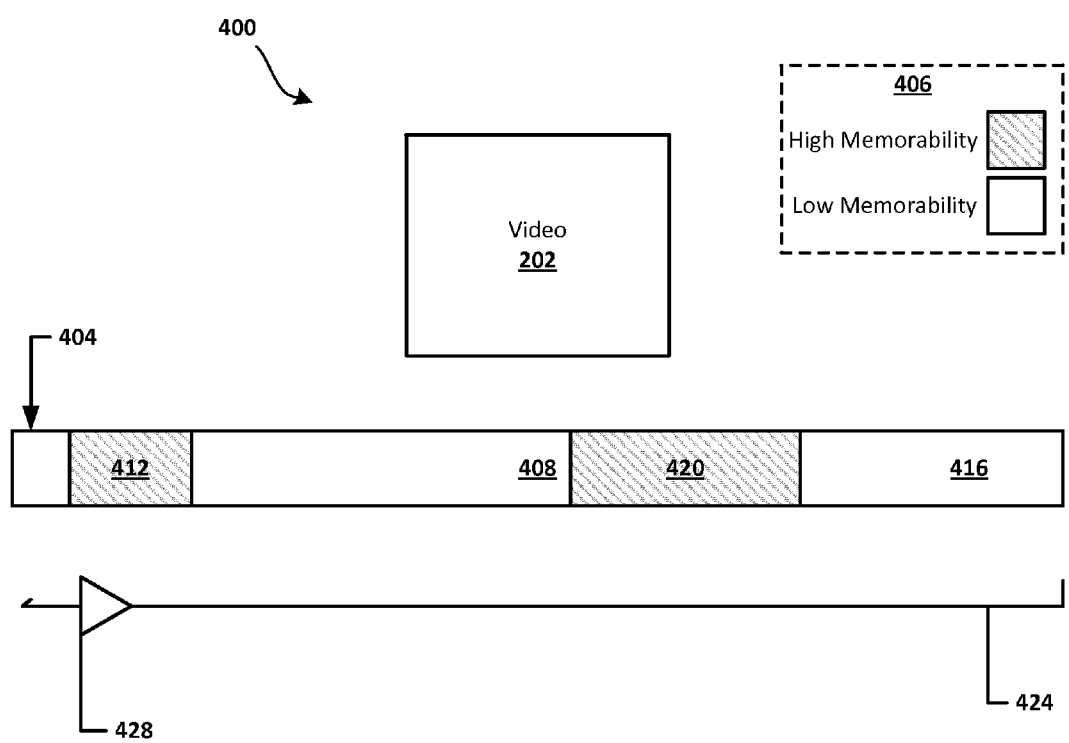
FIG. 4 is an example of a user interface configured for identifying content features having high and low memorability as a function of temporal location within a video, in accordance with an embodiment of the present disclosure.

FIG. 4 illustrates a user interface 400, in one embodiment, used to provide results of the memorability analysis described above. The user interface includes a display of video content 202 being analyzed, a memorability map 404, a legend 406, and a video timeline 424.

The video content 202 displayed is optionally provided for display to the video creator or editor during analysis to provide a convenient reference to the video feature identified in the memorability map 404 as either likely memorable or unlikely to be memorable.

The memorability map 404 is used in conjunction with the video timeline 424 to identify content features within the video content 202 that are likely to be memorable or unlikely to be memorable. Using this information, video editors and creators may then further understand, edit, and revise a video to enhance its memorability. The memorability map 404 also provides an editor or creator with a reference by which to judge whether ideas and content features the editor or creator intended to be memorable actually have been found to be memorable.

The memorability map 404 includes areas highlighted as unlikely to be memorable 408 and 416 and areas highlighted as likely to be memorable 412 and 420. The shading used to identify these different regions is defined in legend 406. The determination of whether to identify an area on the memorability map 404 as corresponding to either memorable or unlikely to be memorable content features is, in one embodiment, based on upper and lower thresholds of content memorability scores. These thresholds are, in some examples, set by users, set automatically by the system based on an analysis of a distribution of memorability scores of video content analyzed by the memorability analysis system 512 (described below in the context of FIG. 5), or set automatically by the system based on an analysis of a distribution of memorability scores of video content associated with a specific user.

As the video 202 is played, a location indicator 428 progresses over the timeline 424. With reference to the memorability map 404, the video 202, the timeline 424 and the location indicator 428 on the timeline 424, a viewer is able to conveniently identify the content features identified by highlighting in the memorability map 404 as either likely or unlikely to be memorable.

In some embodiments, one or more image styles may also be presented in the user interface 400. In one example, content features identified as more likely to be memorable 412 in the memorability map 404 are presented in the user interface 400 in one or more frames, each of which has an image style applied to it to improve memorability. The viewer may then select which image style to apply to the one or more frames.

Example System

Figure 5A:
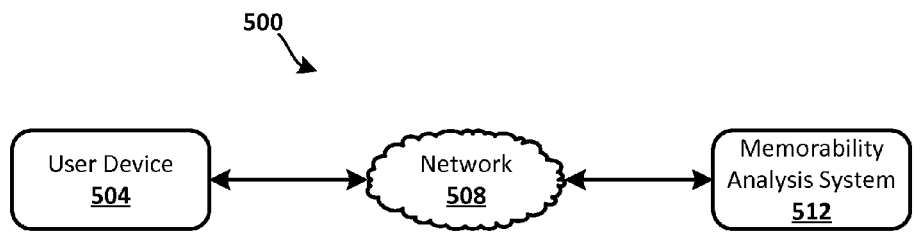
FIG. 5A is a block diagram of a distributed processing environment that includes a memorability analysis system remotely coupled to a computing device of a given user by a communication network, in accordance with an embodiment of the present disclosure.

FIG. 5A is a block diagram of a system environment 500 of a memorability analysis system for analyzing memorability of content features of a video and providing recommendations for improving the memorability of the content features or of the video as a whole. The system environment 500 shown in FIG. 5A includes a user device 504, a network 508, and a memorability analysis system 512. In other embodiments, the system environment 500 includes different and/or additional components than those shown in FIG. 5A.

The user device 504 is a computing device capable of receiving user input as well as transmitting and/or receiving data via the network 508. In one embodiment, the user device 504 is a conventional computer system, such as a desktop or laptop computer. In another embodiment, the user device 504 may be a device having computer functionality, such as a personal digital assistant (PDA), mobile telephone, tablet computer, smartphone or similar device. In some embodiments, the user device 504 is a mobile computing device used for recording video content by a first user and an analogous mobile computing user device is used for viewing video content. The user device 504 is configured to communicate with the memorability analysis system 512 via the network 508. In one embodiment, the user device 504 executes an application allowing a user of the user device 504 to interact with the memorability analysis system 512, thus becoming a specialized computing machine. For example, the user device 504 executes a browser application to enable interaction between the user device 504 and the memorability analysis system 512 via the network 508. In another embodiment, a user device 504 interacts with the memorability analysis system 512 through an application programming interface (API) that runs on the native operating system of the user device 504, such as IOS® or ANDROID™.

The user device 504 is configured to communicate via the network 508, which may comprise any combination of local area and/or wide area networks, using both wired and wireless communication systems. In one embodiment, the network 508 uses standard communications technologies and/or protocols. Thus, the network 508 may include links using technologies such as Ethernet, 802.11, worldwide interoperability for microwave access (WiMAX), 3G, 4G, CDMA, digital subscriber line (DSL), etc. Similarly, the networking protocols used on the network 508 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network 508 may be represented using technologies and/or formats including hypertext markup language (HTML) or extensible markup language (XML). In addition, all or some of links can be encrypted using conventional encryption technologies such as secure sockets layer (SSL), transport layer security (TLS), and Internet Protocol security (IPsec).

The memorability analysis system 512, described below in the context of FIG. 5B in more detail, comprises one or more computing devices storing videos transmitted to the system by users via the network 108. In one embodiment, the memorability analysis system 512 includes user profiles associated with the users of the system. The user profiles enable users to separately store transmitted video content in any stage of editing and memorability analysis associated with the user. In some embodiments, the user profiles also include login credentials, user demographic information, user preferences, social connections between the user and others, contact information for socially connected users, and other tools facilitating the editing and sharing of video content.

The memorability analysis system 512 is configured, upon receipt of video content, to perform the some or all of the embodiments described above to analyze video content for memorability, identify content features within a video more likely to be memorable, and provide recommendations to further improve memorability of a video or of content features within the video. In some embodiments, the memorability analysis system 512 also includes functions that enable the sharing of video content analyzed and edited for memorability improvement. In these embodiments, a user optionally transmits instructions to the memorability analysis system in response to receiving results of the memorability analysis that permit access to a video. The access permitted can be restricted to those expressly permitted by the user, other users socially connected to the user, or accessible without any restriction. Using the semantic analysis described above in the context of FIG. 2, the memorability analysis system 512 recommends an analyzed, and optionally edited, video to users of the system based on a comparison of user profile information to the results of the semantic analysis.

Figure 5B:
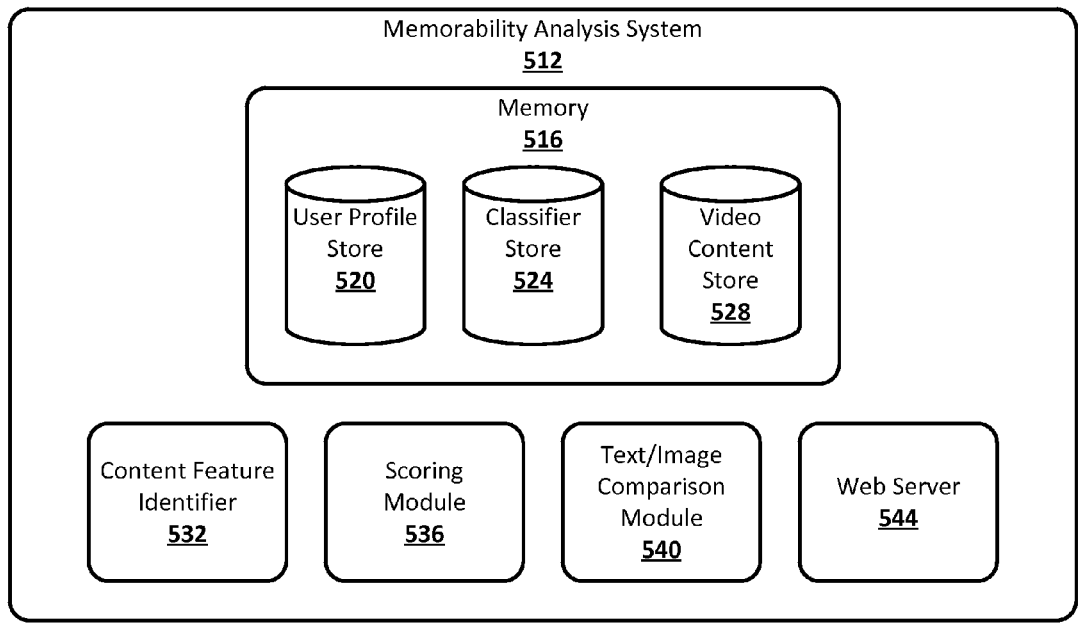
FIG. 5B is a block diagram of a memorability analysis system configured to improve memorability of a video, in accordance with an embodiment of the present disclosure.

FIG. 5B is a block diagram of a system architecture of the memorability analysis system 512 as shown in FIG. 5A. The memorability analysis system 512 includes memory 516, a content feature identifier 532, a scoring module 536, a text/image comparison module 540, and a web server 544.

The memory 516 is depicted as including three distinct elements: a user profile store 520, a classifier store 524, and a video content store 528. The user profile store 520 stores user profile information described above in the context of FIG. 5A. For example, the user profile store 520 stores in memory user login credentials that are used to provide a secure storage location of user transmitted video content and limit access to the memorability analysis system 512 to authorized users. The user profile store 520 also stores in memory user preferences, user demographic information, social connections, and user demographic information. As mentioned above, this information is used by the memorability analysis system 512 to improve the convenience to the user of using the system, and provide convenient mechanisms for storing, editing, and sharing analyzed videos.

The classifier store 524 stores in memory any content used to train the classifiers, the classifier algorithms, and data corresponding to the trained classifiers. As mentioned above, the trained classifiers are applied in order to provide memorability analysis in a computationally efficient manner.

The video content store 528 stores in memory video content as transmitted by users in original, unanalyzed form. The video content store 528 also stores in memory any analytical results produced by embodiments described above such as the methods 100 and 200 depicted in FIGS. 1 and 2, and the data used to produce the user interface shown in FIG. 4. Video content store 528 also stores in memory videos that have been edited by users.

The content feature identifier 532 and scoring module 536 execute the elements of the methods 100 and 200 used to identify content features (such as a video feature and associated text feature) within a video and score the identified features with respect to memorability. In one embodiment, the content feature identifier 532 performs element 108 shown in FIG. 1, and which is shown in greater detail in FIG. 2 as elements 220, 224, 228, 232, and 244. The scoring module 536 performs element 112 shown in FIG. 1, and which is shown in greater detail in FIG. 2 as elements 236, 240, 248, 252, 256, and 260. While other embodiments of the present disclosure may not perform the described elements in exactly the same sequence, the result of operation of the content feature identifier 532 and the scoring module 536 is a content memorability score 260 associated with at least one of a video and one or more content features within the video (i.e., a video feature or a video feature associated with a text feature).

The web server 544 links the memorability analysis system 512 to the user device 504 via the network 508. The web server 544 serves web pages, as well as other web-related content, such as JAVA®, FLASH®, XML and so forth. The web server 544 may provide the functionality of receiving video content from a user device 504, transmitting memorability analysis results recommendations to a user device, and facilitating the publication, transmission, and sharing of videos. Additionally, the web server 544 may provide application programming interface (API) functionality to send data directly to native client device operating systems, such as IOS®, ANDROID™, WEBOS® or RIM. The web server 544 also provides API functionality for exchanging data with the user device 504.

Example Computing Device

Figure 6:
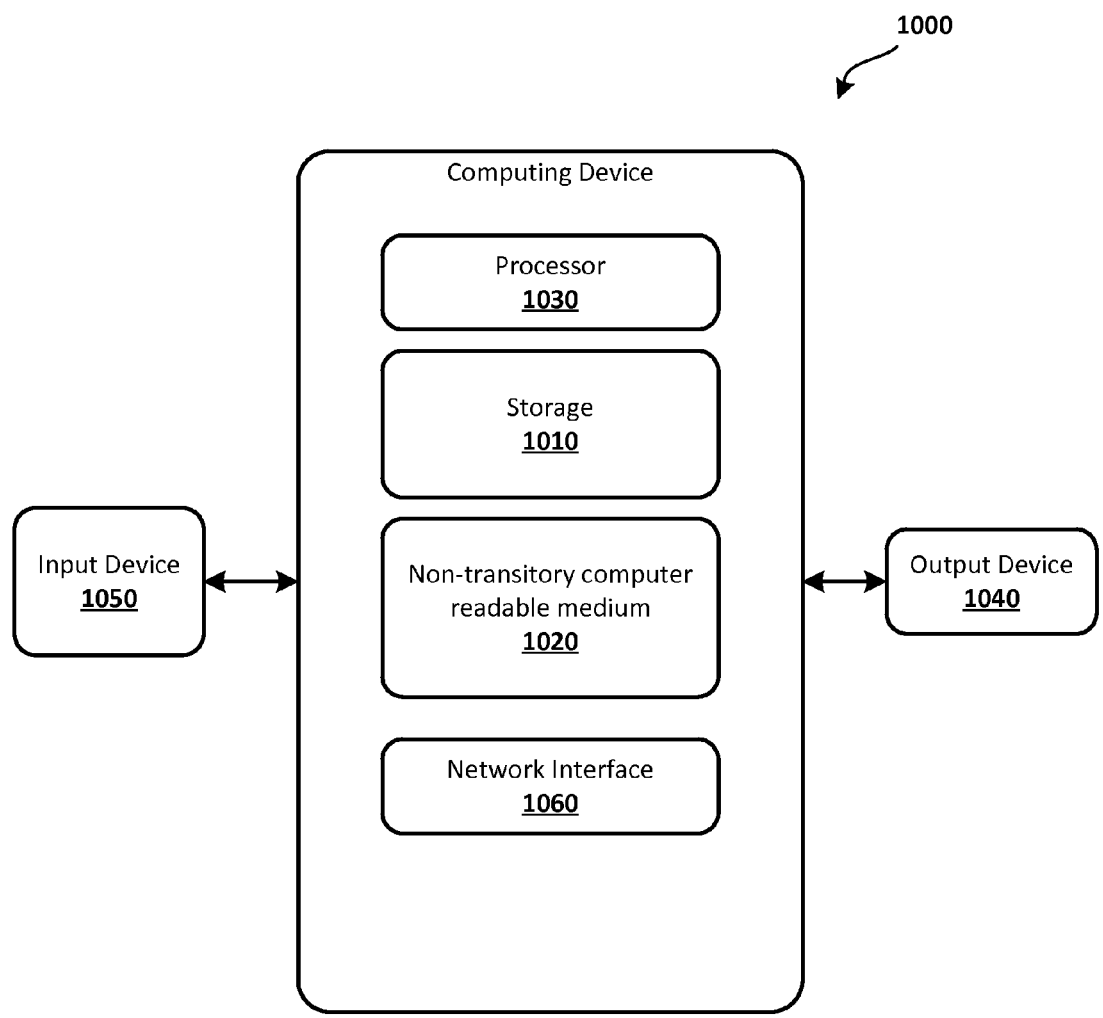
FIG. 6 is a block diagram representing an example computing device that may be used in accordance with an embodiment of the present disclosure of the present disclosure.

FIG. 6 is a block diagram representing an example computing device 600 that may be used to perform any of the techniques as variously described in this disclosure. For example, the user device, the memorability analysis system, the various modules of the memorability analysis system depicted in FIG. 5B, or any combination of these may be implemented in the computing device 600. The computing device 600 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described in this disclosure. A distributed computational system may be provided comprising a plurality of such computing devices.

The computing device 600 includes one or more storage devices 604 and/or non-transitory computer-readable media 608 having encoded thereon one or more computer-executable instructions or software for implementing techniques as variously described in this disclosure. The storage devices 604 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement various embodiments as taught in this disclosure. The storage device 604 may include other types of memory as well, or combinations thereof. The storage device 604 may be provided on the computing device 600 or provided separately or remotely from the computing device 600. The non-transitory computer-readable media 608 may include, but are not limited to, one or more types of hardware memory, non-transitory tangible media (for example, one or more magnetic storage disks, one or more optical disks, one or more USB flash drives), and the like. The non-transitory computer-readable media 608 included in the computing device 600 may store computer-readable and computer-executable instructions or software for implementing various embodiments. The computer-readable media 608 may be provided on the computing device 600 or provided separately or remotely from the computing device 600.

The computing device 600 also includes at least one processor 612 for executing computer-readable and computer-executable instructions or software stored in the storage device 604 and/or non-transitory computer-readable media 608 and other programs for controlling system hardware. Virtualization may be employed in the computing device 600 so that infrastructure and resources in the computing device 600 may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 600 through an output device 616, such as a screen or monitor, which may display one or more user interfaces provided in accordance with some embodiments. The output device 616 may also display other aspects, elements and/or information or data associated with some embodiments. The computing device 600 may include other I/O devices 620 for receiving input from a user, for example, a keyboard, a joystick, a game controller, a pointing device (e.g., a mouse, a user's finger interfacing directly with a display device, etc.), or any suitable user interface. The computing device 600 may include other suitable conventional I/O peripherals, such as a camera and a network interface system 624 to communicate with the input device 620 and the output device 616 (through e.g., a network). The computing device 600 can include and/or be operatively coupled to various suitable devices for performing one or more of the functions as variously described in this disclosure.

The computing device 600 may run any operating system, such as any of the versions of Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device 600 and performing the operations described in this disclosure. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

As will be appreciated in light of this disclosure, the various modules and components of the system shown in FIGS. 5A and 5B, such as the content feature identifier 532, score module 523, text/image comparison module 540, can be implemented in software, such as a set of instructions (e.g., HTML, XML, C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided in this disclosure to be carried out. It will be appreciated that, in some embodiments, various functions performed by the user computing system, as described in this disclosure, can be performed by similar processors and/or databases in different configurations and arrangements, and that the depicted embodiments are not intended to be limiting. Various components of this example embodiment, including the computing device 600, can be integrated into, for example, one or more desktop or laptop computers, workstations, tablets, smart phones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Numerous embodiments and variations will be apparent in light of this disclosure. One example embodiment is a computer-implemented method for quantifying memorability of video content. The method includes receiving a video that includes at least one content feature, the content feature comprising a video feature associated with a text feature, identifying the video feature and the associated text feature in the received video, and determining a video feature score corresponding to the video feature for each of the at least one content features, the video feature score indicating memorability of the corresponding video feature, a text feature score corresponding to the text feature associated with the video feature for each of the at least one content features, the text feature score indicating memorability of the corresponding text feature, and a content memorability score that is based on at least the video feature score and the text feature score. In one example of this embodiment, a similarity metric quantifying a semantic similarity between the video feature and the associated text feature is determined and the content memorability score is determined based on the similarity metric, the video feature score, and the text feature score. In one embodiment, the similarity metric is normalized to a value between 0 and 1 prior to determining the content memorability score and responsive to determining content feature scores corresponding to each of the at least one identified content features, a subset of content features having content memorability scores above a threshold is identified. The identified subset of content features is presented in a user interface that includes a memorability map highlighting the content features having content memorability scores above the threshold. In another example, the video content feature score and the text content feature score are used to determine a content memorability score for the received video as whole. In another example, an edit is applied to the received video, a revised content memorability score is determined based on the applied edit, and a revised content memorability score using the revised feature score is presented. In another example, an edit is applied to at least one of the identified video features and the associated text feature, a revised feature score is determined that corresponds to the edited at least one of the identified video feature and the associated text feature, the revised feature score based on the edit, and a revised content memorability score is determined based on the revised feature scores. In one example, determining at least one feature score includes analyzing the video feature with a deep neural network learning algorithm to identify a semantic meaning of the video feature. Another example embodiment is instantiated in a computer program product for quantifying memorability of video content, the computer program product including one or more non-transitory computer-readable storage mediums containing computer program code that, when executed by one or more processors, performs the methodology as variously provided in this paragraph and elsewhere in this specification.

Another example embodiment of the present disclosure is a system that includes a web server configured for receiving a video that includes at least one content feature, the content feature including a video feature associated with a text feature, a content feature identifier configured for identifying the video feature and the associated text feature in the received video, and a scoring module. The scoring module is configured for determining a video feature score corresponding to the video feature for each of the at least one content features, the video feature score indicating memorability of the corresponding video feature, a text feature score corresponding to the text feature associated with the video feature for each of the at least one content features, the text feature score indicating memorability of the corresponding text feature, and a content memorability score that is based on at least the video feature score and the text feature score. The system further includes a text and image comparison module configured for determining a similarity metric quantifying a semantic similarity between the video feature and the associated text feature and normalizing the similarity metric to a value between 0 and 1. The scoring module is further configured for determining a content memorability score that is a function of the normalized similarity metric, the video feature score and the text feature score. In one embodiment, the content feature identifier is further configured for analyzing the video feature with a deep neural network learning algorithm to identify a semantic meaning of the video feature.

ADDITIONAL REMARKS

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A computer-implemented method for quantifying memorability of video content, the method comprising:
    receiving a video that includes a content feature that comprises a video feature that is associated with a text feature;
    identifying the video feature and the associated text feature in the received video; and
    determining:
        a video feature score corresponding to the video feature, the video feature score indicating memorability of the video feature;
        a text feature score corresponding to the text feature, the text feature score indicating memorability of the corresponding text feature;
        a similarity metric quantifying a semantic similarity between the video feature and the associated text feature; and
        a content memorability score that is based on at least the similarity metric the video feature score and the text feature score.

2. The computer-implemented method of claim 1, further comprising at least one of:
    normalizing the similarity metric to a value between 0 and 1 prior to determining the content memorability score;
    responsive to determining the video and text feature scores, determining whether the content memorability score is above a threshold; and
    presenting the content feature in a user interface that includes a memorability map highlighting a temporal location of the content feature in the received video.

3. The computer-implemented method of claim 1, further comprising using at least one of the video feature score and the text feature score to determine the content memorability score for the received video.

4. The computer-implemented method of claim 3, further comprising:
    applying an edit to the received video;
    determining a revised content memorability score based on the edit; and
    presenting the revised content memorability score.

5. The computer-implemented method of claim 1, further comprising:
    editing the identified video feature;
    determining a revised video feature score corresponding to the edited video feature; and
    determining a revised content memorability score using the revised video feature score.

6. The computer-implemented method of claim 1, wherein the determining the video feature score includes analyzing the video feature with a deep neural network learning algorithm to identify a semantic meaning of the video feature.

7. The computer-implemented method of claim 1, further comprising:
    editing the text feature;
    determining a revised text feature score corresponding to the edited text feature; and
    determining a revised content memorability score using the revised text feature score.

8. A computer program product for quantifying memorability of video content, the computer program product comprising a non-transitory computer-readable storage medium containing computer program code that, when executed by one or more processors, performs a process, the process comprising:
    receiving a video that includes a content feature that comprises a video feature that is associated with a text feature;
    identifying the video feature and the associated text feature in the received video; and
    determining:
        a video feature score corresponding to the video feature, the video feature score indicating memorability of the video feature;
        a text feature score corresponding to the text feature, the text feature score indicating memorability of the corresponding text feature;
        a similarity metric quantifying a semantic similarity between the video feature and the associated text feature; and
        a content memorability score that is based on at least the similarity metric, the video feature score and the text feature score.

9. The computer program product of claim 8, the process further comprising at least one of:
    normalizing the similarity metric to a value between 0 and 1 prior to determining the content memorability score;

responsive to determining the video and text feature scores, determining whether the content memorability score is above a threshold; and presenting the content feature in a user interface that includes a memorability map highlighting a temporal location of the content feature in the received video.

10. The computer program product of claim 8, the process further comprising using at least one of the video feature score and the text feature score to determine the content memorability score for the received video.

11. The computer program product of claim 8, the process further comprising:
    editing the video feature;
    determining a revised video feature score corresponding to the edited video feature; and
    determining a revised content memorability score using the revised video feature score.

12. The computer program product of claim 8, wherein the determining the video feature score includes analyzing the video feature with a deep neural network learning algorithm to identify a semantic meaning of the video feature.

13. The computer program product of claim 8, the process further comprising:
    editing the text feature;
    determining a revised text feature score corresponding to the edited text feature; and
    determining a revised content memorability score using the revised text feature score.

14. A system for quantifying memorability of video content, the system comprising:
    a web server configured for receiving a video that includes a content feature that comprises a video feature that is associated with a text feature;
    a content feature identifier configured for identifying the video feature and the associated text feature in the received video;
    a scoring module configured for determining:
        a video feature score corresponding to the video feature, the video feature score indicating memorability of the video feature; and
        a text feature score corresponding to the text feature, the text feature score indicating memorability of the corresponding text feature; and
    a text and image comparison module configured for determining a similarity metric quantifying a semantic similarity between the video feature and the associated text feature;
    wherein the scoring module is further configured for determining a content memorability score that is based on at least the similarity metric, the video feature score and the text feature score.

15. The system of claim 14, wherein the text and image comparison module is further configured for normalizing the similarity metric to a value between 0 and 1.

16. The system of claim 14,
    wherein the text and image comparison module is further configured for normalizing the similarity metric to a value between 0 and 1; and
    wherein the scoring module is further configured for determining the content memorability score as a function of the normalized similarity metric, the video feature score and the text feature score.

17. The system of claim 14, wherein the content feature identifier is further configured for analyzing the video feature with a deep neural network learning algorithm to identify a semantic meaning of the video feature.

* * * * *

UNITED STATES PATENT AND TRADEMARK OFFICE
CERTIFICATE OF CORRECTION

PATENT NO. : 9,805,269 B2
APPLICATION NO. : 14/946952
DATED : October 31, 2017
INVENTOR(S) : Sumit Shekhar et al.

Page 1 of 1

It is certified that error appears in the above-identified patent and that said Letters Patent is hereby corrected as shown below:

In the Claims

Column 14, Line 23, Claim 5, please replace "editing the identified video feature;" with --editing the video feature;--.

Signed and Sealed this
Eighth Day of May, 2018

Andrei Iancu
*Director of the United States Patent and Trademark Office*